United States Patent Office 3,577,536
Patented May 4, 1971

3,577,536
METHOD OF CONTROLLING INSECTS AND ARACHNIDS WITH TETRAHYDROQUINOX-ALINYL PHOSPHATES OR THIOPHOSPHATES
Bernard Miller, Amherst, Mass., and Tamara Helen Mladineo Gund, Mercer, N.J., assignors to American Cyanamid Company, Stamford, Conn.
No Drawing. Original application Aug. 7, 1967, Ser. No. 658,637, now Patent No. 3,505,327, dated Apr. 7, 1970. Divided and this application Mar. 31, 1970, Ser. No. 24,381
Int. Cl. A01n 9/36
U.S. Cl. 424—200
10 Claims

ABSTRACT OF THE DISCLOSURE

A method of protecting crops and controlling insects or arachnids by applying a compound having the formula:

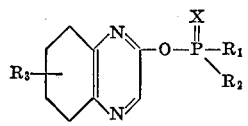

wherein X is a member selected from the group consisting of sulfur and oxygen; $R_1$ and $R_2$ are each lower alkyl, lower alkoxy, lower thioalkyl, phenyl, halophenyl, benzyl or $-NR_4R_5$; $R_3$ is hydrogen or lower alkyl; and $R_4$ and $R_5$ are each selected from the group consisting of hydrogen and lower alkyl.

---

This application is a divisional of our copending application for Letters Patent, Ser. No. 658,637, filed Aug. 7, 1967, now Pat. No. 3,505,327.

The present invention relates to new tetrahydroquinoxalinyl phosphates, thiophosphates and the like, a method for the preparation thereof, and to a method of controlling insects and arachnids therewith. More particularly, it is concerned with a compound of the formula:

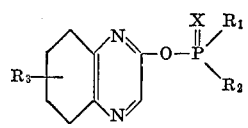

wherein X is a sulfur or an oxygen atom, $R_1$ and $R_2$ are each lower alkyl, lower alkoxy, lower thioalkyl, aryl, such as phenyl or halophenyl, aralkyl, such as benzyl or $-NR_4R_5$, $R_3$ is hydrogen or lower alkyl, and $R_4$ and $R_5$ are each hydrogen or lower alkyl; a method for the preparation of said compounds and a method of controlling insects and arachnids which damage agronomic crops and/or have a detrimental effect on man and animals.

Illustrative compounds falling within the purview of the invention are:

O,O-diethyl O-5,6,7,8-tetrahydro-6(7)-methyl-2-quinoxalinyl phosphorothioate,
O,O-dimethyl O-5,6,7,8-tetrahydro-2-quinoxalinyl phosphorothioate,
O,O,-diisopropyl O-5,6,7,8-tetrahydro-2-quinoxalinyl phosphorothioate,
Diisopropyl 5,6,7,8-tetrahydro-2-quinoxalinyl phosphate,
O,O-diethyl O-5,6,7,8-tetrahydro-2-quinoxalinyl phosphorothioate,
O-ethyl O-methyl O-5,6,7,8-tetrahydro-2-quinoxalinyl phosphorothioate,
N,N-dimethyl-O-ethyl O-5,6,7,8-tetrahydro-2-quinoxalinyl phosphoroamidothioate,
O-ethyl O-5,6,7,8-tetrahydro-6(7)-methyl-2-quinoxalinyl phenylphosphonothioate,
O-S-dimethyl O-5,6,7,8-tetrahydro-2-quinoxalinyl phosphorodithioate,
O-ethyl O-5,6,7,8-tetrahydro-2-quinoxalinyl ethanephosphonate,
S,S-dimethyl O-5,6,7,8-tetrahydro-2-quinoxalinyl phosphorodithioate,
O-isopropyl O-methyl O-5,6,7,8-tetrahydro-2-quinoxalinyl phosphorothioate,
Diethyl 5,6,7,8-tetrahydro-2-quinoxalinyl phosphate and
O,O-dipropyl O-5,6,7,8-tetrahydroquinoxalinyl phosphorothioate.

Th compounds of the invention can be synthesized in a straightforward and conomical manner by effecting a reaction between a tetrahydroquinoxaline and a phosphorus-containing ester halide in the presence of a strong base. The overall reaction may be graphically written as follows:

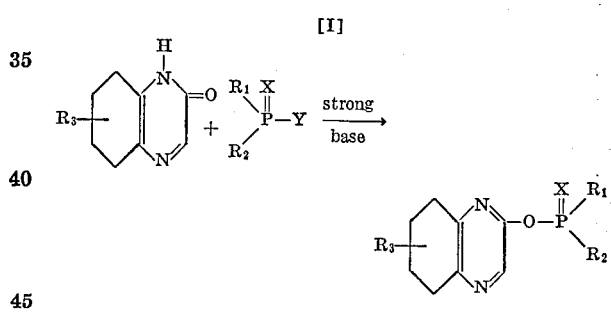

wherein Y is halogen, such as chlorine or bromine; X is sulfur or oxygen; $R_1$ and $R_2$ are each selected from the group consisting of lower alkyl, lower alkoxy, lower thioalkyl, $-NR_4R_5$ and aryl, such as phenyl or halophenyl, and alkaryl, such as benzyl; and $R_3$ is hydrogen or lower alkyl; and $R_4$ and $R_5$ are each selected from the group consisting of hydrogen and lower alkyl. Preferably, the reaction is carried out in the presence of an inert solvent, such as t-butanol, dimethylsulfoxide, dimethylformamide or water over a wide-range of temperatures, usually between about 0° C. and 100° C. Among the strong bases which are useful in the process are sodium and potassium t-butoxide, sodium and potassium hydroxide and tertiary amines, such as trimethylamine.

The tetrahydroquinoxalines can be conveniently prepared by initially halogenating a cyclohexanone. The reaction is carried out in the presence of an acid, such as glacial acetic acid, and the overall reaction is shown by the following graphic equation:

[II]

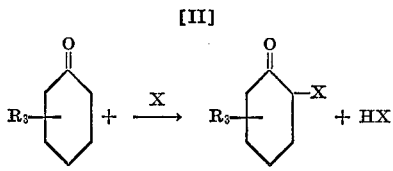

wherein $X_2$ is either chlorine or bromine.

The halogenated cyclohexanone may then be treated with aqueous ferric chloride solution at an elevated temperature, preferably at boiling, to give a cyclohexanedione, which is next treated with a glycinamide hydrohalide, such as glycinamide hydrochloride, at from 0° C. to 100° C. in the presence of a suitable base to yield the desired tetrahydroquinoxaline. The reaction is graphically illustrated as:

[III]

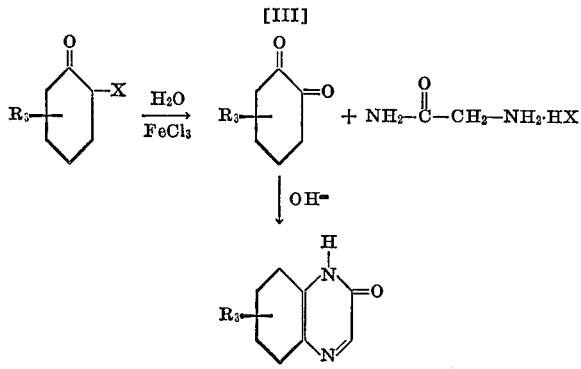

An illustrative tetrahydroquinoxaline reactant for Reaction [I] above is:

2-Oxy-5,6,7,8-tetrahydroquinoxaline,
6(7)-Methyl-2-oxy-5,6,7,8-tetrahydroquinoxaline, and
6(7)-Ethyl-2-oxy-5,6,7,8-tetrahydroquinoxaline.

Exemplary phosphorylating agents which may be employed in Reaction [I] above are:

O,O-dimethyl pohsphorochloridothioate,
O,O-diethyl phosphorochloridothioate,
O-methyl, O-ethyl phosphorochloridothioate,
O,O-diisopropyl phosphorobromidothioate,
O,O-di-n-butyl phosphorochloridothioate,
O,O-dimethyl phosphorochloridate,
O,O-diethyl phosphorochloridate,
O-ethyl ethanephosphonochloridothioate,
O-ethyl-N,N-dimethyl phosphoramidochloridothioate,
O-ethyl, phenylphosphonochloridothioate,
O-ethyl-N-isopropyl phosphoramidochloridothioate,
O-ethyl-N-methyl phosphoramidochloridothioate,
Diethylphosphorochloridotrithioate, and
Diethylphosphinothioyl bromide.

The compounds of the invention are useful as insecticides and arachnicides. They may be applied as solids or in the form of liquid sprays either in conventional type formulations, low volume or as ultra low volume applications, hereinafter referred to as L.V. or U.L.V., respectively.

Solid formulations can be prepared by dissolving the active compound in a solvent, generally a relatively volatile organic solvent, such as xylene, cyclohexanone, a lower alcohol or the like, spraying the solution onto an agitated bed of inert solid carrier, such as attapulgite, kaolin, talc or diatomaceous earth in granular or finely ground form, and, thereafter, drying the thus prepared formulation. Preparation of wettable powders, which are diluted with water before spraying, usually include the addition of an emulsifier, such as an alkyl aryl sulfonate, alkyl aryl polyglycol ether, and the polyalkylene fatty acid esters. Such formulations usually contain from about 25% to 95% by weight of toxicant and are prepared with finely ground inert carrier.

In general, the liquid sprays can be prepared as concentrates by dissolving the toxicant in an organic solvent, such as xylene, benzene, lower alcohol, fuel oil, or the like, with or without an emusifying agent, and further diluting with either water or an organic diluent, such as deodorized kerosene for application. The concentrates generally contain from about 20% to 95% by weight of toxicant and when diluted for application may contain as little as 0.01% of active material.

The toxicant may also be diluted with a small amount of an essentially non-evaporative solvent, such as the high aromatic solvents (95% or better aromatics), having a flash point above about 125° F., such as "Panasol" or "Socal 44L." The mixture is applied as such at very low rates (i.e., about 1 to 32 fluid ounces per acre).

Advantageously, the compounds of the invention have activity against a wide variety of economically important plant pests. Moreover, they are highly effective as either contact or systemic pesticides and are outstanding for the control of soil insects and provide excellent control of both the larval and adult stages of both insects and arachnids. Additionally, it has been observed that the compounds of the invention are non-phytotoxic at pesticidally effective rates.

The invention will be better understood by referring to the illustrative examples set forth below. These are not to be taken as limitative of the invention. All parts are by weight unless otherwise stated.

EXAMPLE 1

Preparation of 2-bromo-4-methylcyclohexanone

A few drops of bromine are added to a solution of 50 parts of 4-methyl-cyclohexanone, 20 parts (by volume) of glacial acetic acid and 85 parts of water in a suitable reaction vessel. The mixture is then heated to 60° C. until all the bromine is absorbed. An additional 25 parts of bromine are then added to the stirred mixture, keeping the temperature below 60° C. The mixture is next added to ice water, extracted with methylene chloride, and the methylene chloride layer washed with potassium bicarbonate solution and dried. Evaporation of the solvent yields 84.0 parts of 2-bromo-4-methylcyclohexanone as an oil.

EXAMPLE 2

Preparation of 4-methylcyclohexane-1,2-dione

A mixture of 84.0 parts of 2-bromo-4-methylcyclohexanone in 500 parts of water is stirred vigorously at 95° C. for 10 minutes in a suitable reaction vessel. 125 parts of ferric chloride hexahydrate in 100 parts of hot water are added and the reaction mixture is maintained at 95° C. for 20 minutes. It is then cooled to 40° C., saturated with ammonium sulfate and extracted with methylene chloride. The methylene chloride layer is dried over magnesium sulfate and evaporated to yield 59.2 parts of 4-methylcyclohexane-1,2-dione as a dark red oil.

EXAMPLE 3

Preparation of 6(7)-methyl-2-oxy-5,6,7,8-tetrahydroquinoxaline

A mixture of 43.0 parts of 4-methylcyclohexane-1,2-dione, 60.0 parts of glycinamide hydrochloride and 100 parts of water are cooled in ice. 100 parts (by volume) of a 40% sodium hydroxide solution are added and the solution stirred for 45 minutes. It was then acidified and a gummy solid is recovered. The latter is washed with methylene chloride and then triturated with ethanol to yield 4.5 parts of 6(7)-methyl-2-oxy-5,6,7,8-tetrahydroquinoxaline as a white solid, having a melting point equal to 258° C.–260° C.

EXAMPLE 4

Preparation of O,O-diethyl 0–5,6,7,8-tetrahydro-6(7)-methyl-2-quinoxalinyl phosphorothioate 4.2 parts of 6(7)-methyl-2-oxy-5,6,7,8-tetrahydroquinoxaline are added to a solution of 4.2 parts of potassium t-butoxide in t-butanol. The mixture is cooled in an ice bath and 3.56 parts of O,O-diethyl phosphorochloridothioate then added. After 15 minutes, the reaction mixture is poured into a mixture of ice water and methylene chloride. The methylene chloride layer is washed thoroughly with water and dried. The solvent is finally evaporated and the residue chromatographed on alumina to yield 3.30 parts of above-named product as a yellow oil.

*Analysis.*—Calcd. for $C_{13}H_{21}N_2O_3PS$ (percent): C, 49.36; H, 6.64; N, 8.86; S, 10.15; P, 9.80. Found (percent): C, 50.20; H, 6.87; N, 9.97; S, 11.22; P, 10.61.

EXAMPLE 5

Preparation of 2-oxy-5,6,7,8-tetrahydroquinoxaline

A solution of 6.0 parts of glycinamide hydrochloride and 5.0 parts of cyclohexane-1,2-dione in 50 parts of water is cooled in an ice bath and 10 parts of 40% aqueous sodium hydroxide solution are added thereto. After five minutes the solution is heated and vigorously stirred at 40° C. for 1.5 hours. It is then cooled in an ice bath and 30 parts of water are added. Concentrated hydrochloric acid is added until the pH of the solution is about 5. Solid sodium bicarbonate is next added to neutralize the mixture. The solid precipitate is filtered, washed with water, and dried under vacuum to give 5.8 parts (86%) of the desired product, melting point 268° C.–270° C.

*Analysis.*—Calcd. for $C_8H_{10}N_2O$ (percent): C, 63.9; H, 6.70; N, 18.6. Found (percent): C, 63.7; H, 7.00; N, 18.4.

EXAMPLE 6

Preparation of O,O-dimethyl O-5,6,7,8-tetrahydro-2-quinoxalinyl phosphorothioate A stirred solution of 5.0 parts of tetramethylene-2-pyrazinone and 3.75 parts of potassium t-butoxide in 100 parts (by volume) of t-butanol is cooled to about 15° C. To the cooled solution is next added 5.35 parts of O,O - dimethyl phosphorochloridothioate. Resultant mixture is stirred at room temperature for 15 minutes and then at 40° C. for an additional fifteen minutes. Water is then added and the mixture extracted with methylene chloride. The methylene chloride solution is washed several times with water, dried over magnesium sulfate, and evaporated to yield 5.6 parts of product as a dark oil identified by NMR analysis.

*Analysis.*—Calcd. for $C_{10}H_{15}N_2O_3PS$ (percent): C, 43.79; H, 5.47; P, 11.31. Found (percent): C, 41.81; H, 5.53; P, 10.92.

EXAMPLE 7

Preparation of O,O-diisopropyl O-5,6,7,8-tetrahydro-2-quinoxalinyl phosphorothioate Five parts of tetrahydro-2-keto-quinoxaline are suspended in 100 parts (by volume) of t-butanol containing 5 parts of potassium t-butoxide. The reaction mixture is refluxed for fifteen minutes, then 5.6 parts of diisopropylphosphorochloridothioate added. The reaction mixture is refluxed until a pH of 7 is attained. Water is then added and the aqueous solution is then extracted with methylene chloride. The methylene chloride solution is separated from the water and dried with magnesium sulfate and upon evaporation of the solvent, the remaining oil is taken up in petroleum ether and chromatographed on alumina. Elution is effected first with petroleum ether and then with methylene chloride to yield the above named product on removal of the solvent.

*Analysis.*—Calcd. for $C_{14}H_{23}N_2O_3PS$ (percent): C, 50.90; H, 6.97; N, 8.48; S, 9.72. Found (percent): C, 49.09; H, 7.01; N, 8.37; S, 9.46.

EXAMPLE 8

Preparation of diisopropyl 5,6,7,8-tetrahydro-2-quinoxalinyl phosphate

Following the procedure of Example 7 but substituting diisopropyl phosphorochloridate for diisopropyl phosphorochloridothioate, there is obtained the above-named product in good yield.

*Analysis.*—Calcd. for $C_{14}H_{23}N_2O_4P$ (percent): C, 53.51; H, 7.33; N, 8.92; P, 9.87. Found (percent): C, 53.13; H, 7.25; N, 8.75; P, 9.77.

EXAMPLE 9

Preparation of O,O-diethyl O-5,6,7,8-tetrahydro-2-quinoxalinyl phosphorothioate 3 parts of tetramethylene-2-pyrazinone are suspended in 50 parts (by volume) of t-butanol containing 3 parts of potassium t-butoxide. The reaction mixture which was previously flushed with nitrogen is refluxed for one and a half hours. Subsequently, 3 parts of diethyl phosphorochloridothioate are added slowly. Resultant reaction mixture is refluxed for one hour and then diluted with water and extracted with methylene chloride. The organic layer is then separated and evaporated under vacuum. 3.6 parts of a brown oil are collected. The oil is finally washed with cold hexane to obtain 2.8 parts of product.

*Analysis.*—Calcd. for $C_{12}H_{19}N_2O_3PS$ (percent): C, 47.69; H, 6.29; N, 9.27; S, 10.61; P, 10.25. Found (percent): C, 47.51; H, 6.37; N, 9.07; S, 10.81; P, 10.27.

EXAMPLE 10

Preparation of O-ethyl O-methyl O-5,6,7,8-tetrahydro-2-quinoxalinyl phosphorothioate 5 parts of tetrahydro-2-keto-quinoxaline are suspended in 100 parts (by volume) of t-butanol containing 5 parts of potassium t-butoxide. The reaction is refluxed for one-half hour, then 5 parts of O-ethyl, O-methyl phosphorochloridothioate are added. The reaction mixture is stirred first at room temperature for one half hour, then at reflux temperature for 3 hours and left overnight at room temperature. Water is added and the mixture extracted with methylene chloride, dried, evaporated and chromatographed to obtain 4.6 parts of product.

*Analysis.*—Calcd. for $C_{11}H_{17}N_2O_3PS$ (percent): C, 45.83; H, 5.90; N, 9.72; P, 10.76. Found (percent): C, 45.65; H, 6.13; N, 9.97; P, 10.53.

EXAMPLE 11

Preparation of N,N-dimethyl-O-ethyl O-5,6,7,8-tetrahydro-2-quinoxalinyl phosphoroamidothioate 5.0 parts of tetrahydro-2-keto-quinoxaline and 3.8 parts of potassium t-butoxide are dissolved in about 100 parts (by volume) of dimethylsulfoxide and cooled to 10° C. 6.3 parts of O-ethyl-N-dimethyl phosphorochloridoamidate are added to the mixture and held under agitation at room temperature for one-half hour. It is then extracted with methylene chloride, and the organic layer washed with water and dried to yield 7.5 parts of a yellow oil.

*Analysis.*—Calcd. for $C_{12}H_{20}PN_3SO_2$ (percent): C, 47.9; H, 6.68; N, 13.97; S, 10.63; P, 10.29. Found (percent): C, 48.06; H, 6.83; N, 14.04; S, 10.62; P, 10.25.

EXAMPLE 12

Preparation of O-ethyl-O-5,6,7,8-tetrahydro-6(7)-methyl-2-quinoxalinyl phenylphosphonothioate To a stirred solution of 5 parts of tetramethylene-2- pyrazinone and 3.8 parts of potassium t-butoxide in 150 parts (by volume) of dimethylsulfoxide at about 10° C. are added 3.8 parts of O-ethyl phenylphosphonochloridothioate. The mixture is worked up, as in Example 11, to yield 5.5 parts of a yellow oil.

Analysis.—Calcd. for $C_{16}H_{19}PN_2SO_2$ (percent): C, 57.5; H, 5.72; N, 8.39; S, 9.58; P, 9.27. Found (percent): C, 57.72; H, 5.68 N, 8.15 S, 9.82 P, 9.26.

EXAMPLE 13

Preparation of O,S-dimethyl O-5,6,7,8-tetrahydro-2-quinoxalinyl phosphorodithioate 5 parts of 5,6,7,8-tetrahydro-2-keto-quinoxaline are suspended in 100 parts (by volume) of t-butanol containing 5 parts potassium t-butoxide. To this mixture, after stirring at reflux for ½ hour, are added five parts of O,S-dimethyl phosphorochloridodithioate. The reaction mixture is stirred at room temperature for sixteen hours and then refluxed for one-half hour. Then water is added and the reaction mixture extracted with methylene chloride. The methylene chloride layer is dried over magnesium sulfate and evaporated to dryness. The dark oil is taken up in petroleum ether and the formed solids are filtered and the filtrate chromatographed on alumina. Elution with petroleum ether and methylene chloride yields 2.5 parts of pure product, analyzing in percent as: Calcd. for $$C_{10}H_{15}N_2O_2PS_2$$

(percent): C, 41.36; H, 5.17; N, 9.65; S, 22.12; P, 10.68. Found (percent): C, 40.96; H, 5.35; N, 8.17; S, 18.26; P, 8.93.

EXAMPLE 14

Preparation of O-ethyl-O-5,6,7,8-tetrahydro-2-quinoxalinyl ethanephosphonate

To a stirred suspension of 5 parts of tetramethylene-2-pyrazinone and 3.8 parts of potassium t-butoxide in 150 parts (by volume) of t-butanol which had been stirred for one hour at room temperature, are added 5.23 parts of ethyl ethanephosphonochloridate. Reaction occurred immediately and the mixture is worked up and then washed with cold n-hexane yielding 6.5 parts of yellow oil. This is taken up in hot hexane, treated with a small amount of alumina, then with charcoal, filtered while still hot, and concentrated leaving 5.2 parts of product whose index of refraction ($n_D{}^{25}$) is 1.5128 and analyzing as: Calcd. for $C_{12}H_{19}PN_2O_3$ (percent): C, 53.3; H, 7.08; N, 10.36; P, 11.44. Found (percent): C, 52.96; H, 6.83; N, 10.22; P, 11.29.

EXAMPLE 15

Preparation of S,S-dimethyl O-5,6,7,8-tetrahydro-2-quinoxalinyl phosphorodithioate 5.0 parts of tetramethylene-2-pyrazinone and 3.75 parts of potassium t-butoxide in 250 parts (by volume) of t-butanol are stirred at room temperature for two hours. 5.9 parts of S,S-dimethyl phosphorochloridothioate are then added and the mixture immediately treated with methylene chloride, washed with water and dried to yield 8.3 parts of yellow oil. The latter is washed with ice-cold hexane, taken up in hot benzene-hexane mixture, treated with charcoal, filtered and concentrated to yield 5.5 parts of an orange oil.

Analysis.—Calcd. for $C_{10}H_{15}PN_2S_2O_2$ (percent): C, 41.4; H, 5.21; N, 9.65; S, 22.05; P, 10.65. Found (percent): C, 41.15; H, 5.20 N, 9.42; S, 22.12; P, 10.59.

EXAMPLE 16

Preparation of O-isopropyl O-methyl-O-5,6,7,8-tetrahydro-2-quinoxalinyl phosphorothioate 2.5 parts of potassium t-butoxide are dissolved in 100 parts (by volume) of t-butyl alcohol and added to a stirred solution of 3.0 parts of tetramethylene-2-pyrazinone in t-butanol. The mixture is stirred until a clear brown solution is formed in about 15 minutes at 45° C. When mixture has been cooled to about 40° C., 3.7 parts of O-isopropyl O-methyl phosphorochloridothioate in t-butanol are added all at once. This mixture is partitioned between 100 parts of water and 100 parts (by volume) of methylene chloride.

The water layer is extracted with 50 parts (by volume) of methylene chloride, and the combined layers washed with 50 parts of water, followed by aqueous 1% sodium bicarbonate and then again with water. After drying over sodium sulfate and filtered to remove solvent, 4.5 parts of brown oil are obtained.

Analysis.—Calcd. for $PN_2SO_3C_{12}H_{19}$ (percent): C, 47.67; H, 6.33; N, 9.27; P, 10.25; S, 10.61. Found (percent): C, 47.31; H, 6.70 N, 10.21; P, 10.26; S, 10.88.

EXAMPLE 17

Preparation of diethyl 5,6,7,8-tetrahydro-2-quinoxalinyl phosphate 10 parts of tetramethylene-2-pyrazinone are dissolved in 300 parts (by volume) of t-butanol containing 10 parts of potassium t-butoxide and reacted with 10 parts of diethyl phosphorchloridate. The mixture is stirred for two hours, then refluxed for 20 minutes and allowed to cool. Water is added to dissolve the resultant solid and the solution is extracted therefrom with methylene chloride. The methylene chloride layer is separated from the water, dried over magnesium sulfate and concentrated to obtain the desired product which analyzes as: Calcd. for $C_{12}H_{19}N_2O_4P$ (percent): C, 50.37; H, 6.64; N, 9.79; P, 10.83. Found (percent): C, 50.50; H, 6.60; N, 9.90; P, 10.70.

EXAMPLE 18

Preparation of O,O-dipropyl O-5,6,7,8-tetrahydroquinoxalinyl phosphorothioate 5 parts of tetramethylene-2-pyrazinone are suspended in 100 parts of t-butanol containing 5 parts of potassium t-butoxide. The reaction mixture is refluxed for one-half hour. 5 parts of di-n-propyl phosphorochloridothioate are then added. Resultant reaction mixture is refluxed for another two hours, water then added and the solution extracted with methylene chloride. The methylene chloride solution is dried over magnesium sulfate and evaporated to dryness. The oil which remains is taken up in petroleum ether. The solution is filtered to remove starting material and the petroleum ether solution chromatographed on alumina. Elution of the above solution with methylene chloride and subsequent removal of solvent yields the desired product which analyzes as: Calcd. for $C_{14}H_{23}N_2O_3PS$ (percent): C, 50.90; H, 6.97; N, 8.48; S, 9.72; P, 9.39. Found (percent): C, 50.80; H, 7.00; N, 8.37; S, 9.65; P, 9.19.

EXAMPLE 19

The insecticidal activity of typical compounds of the invention is demonstrated by the following tests wherein graded levels of toxicant are used for controlling a variety of insect species. Test procedures as well as the results obtained are set forth below:

Bean aphid—*Aphis fabae* Scopoli

Compounds are tested as 0.1%, 0.01% and 0.001% solutions or suspensions in 65% acetone-35% water. Two-inch fiber pots, each containing a nasturtium plant about two inches high and infested with about 150 aphids two days earlier are sprayed with the test solutions so as to give complete coverage of the aphids and the plants. The sprayed plants are laid on their sides on white enamel trays which have had the edges coated with oil as a barrier. Mortality estimates are made after holding for two days at 70° F., and 50% R.H.

Activity reported in Table I as percent kill of insects.

TABLE I

| Structure | Aphids, percent | | |
|---|---|---|---|
| | .1 | .01 | .001 |
| (C₂H₅O)₂P(S)—O—[5,6,7,8-tetrahydroquinoxalin-2-yl] | 100 | 100 | 100 |
| (CH₃O)₂P(S)—O—[5,6,7,8-tetrahydroquinoxalin-2-yl] | 100 | 100 | 100 |
| (C₂H₅O)₂P(O)—O—[5,6,7,8-tetrahydroquinoxalin-2-yl] | 100 | 100 | 100 |
| C₂H₅O(CH₃)₂N–P(S)—O—[5,6,7,8-tetrahydroquinoxalin-2-yl] | 100 | 100 | 25 |
| (i-C₃H₇O)₂P(O)—O—[5,6,7,8-tetrahydroquinoxalin-2-yl] | 100 | 100 | 40 |
| (i-C₃H₇O)₂P(S)—O—[5,6,7,8-tetrahydroquinoxalin-2-yl] | 100 | 100 | 100 |
| (n-C₃H₇O)₂P(S)—O—[5,6,7,8-tetrahydroquinoxalin-2-yl] | 100 | 100 | 100 |
| C₂H₅O(CH₃O)P(S)—O—[5,6,7,8-tetrahydroquinoxalin-2-yl] | 10 | 100 | 100 |
| (CH₃S)₂P(O)—O—[5,6,7,8-tetrahydroquinoxalin-2-yl] | 100 | 100 | 100 |
| CH₃S(CH₃O)P(S)—O—[5,6,7,8-tetrahydroquinoxalin-2-yl] | 100 | 100 | 50 |
| C₂H₅O(C₂H₅)P(O)—O—[5,6,7,8-tetrahydroquinoxalin-2-yl] | 100 | 100 | 100 |
| C₂H₅O(C₆H₅)P(S)—O—[5,6,7,8-tetrahydroquinoxalin-2-yl] | 100 | 100 | 100 |
| (C₂H₅O)₂P(S)—O—[3-methyl-5,6,7,8-tetrahydroquinoxalin-2-yl] | 100 | 100 | 100 |

| Structure | Aphids, percent | | |
|---|---|---|---|
| | .1 | .01 | .001 |
| $(CH_3)_2CHO-\overset{\overset{S}{\|}}{\underset{CH_3O}{P}}-O-\text{[5,6,7,8-tetrahydroquinoxalin-2-yl]}$ | 100 | 100 | 100 |

Southern armyworm—*Prodenia eridania* (Cramer)

The solutions from the aphid test above are also used for this test. Sieva lima bean primary leaves are dipped for three seconds in the test solution and set in a hood on a screen to dry. When dry, each leaf is placed in a 4-inch petri dish which has a moist filter paper in the bottom with ten third-in-star armyworm larvae about ⅜″ long. The dishes are covered and held at 80° F., and 60% R.H. After 2 days, mortality counts and estimates of the amount of feeding are made.

Activity is reported in Table II as percent kill obtained with each level of toxicant.

TABLE II

| Structure | Southern armyworm, percent | | |
|---|---|---|---|
| | .1 | .01 | .001 |
| $(C_2H_5O)_2\overset{\overset{S}{\|}}{P}-O-\text{[tetrahydroquinoxalinyl]}$ | 100 | 100 | 90 |
| $(CH_3O)_2\overset{\overset{S}{\|}}{P}-O-\text{[tetrahydroquinoxalinyl]}$ | 100 | 100 | 40 |
| $(C_2H_5O)_2\overset{\overset{O}{\|}}{P}-O-\text{[tetrahydroquinoxalinyl]}$ | 100 | 100 | 90 |
| $(n-C_3H_7O)_2\overset{\overset{S}{\|}}{P}-O-\text{[tetrahydroquinoxalinyl]}$ | 100 | 100 | 0 |
| $\underset{CH_3O}{\overset{C_2H_5O}{\diagdown}}\overset{\overset{S}{\|}}{P}-O-\text{[tetrahydroquinoxalinyl]}$ | 100 | 100 | 100 |
| $\underset{CH_3O}{\overset{CH_3S}{\diagdown}}\overset{\overset{S}{\|}}{P}-O-\text{[tetrahydroquinoxalinyl]}$ | 100 | 70 | 0 |
| $\underset{C_2H_5}{\overset{C_2H_5O}{\diagdown}}\overset{\overset{O}{\|}}{P}-O-\text{[tetrahydroquinoxalinyl]}$ | 100 | 100 | 20 |
| $\underset{C_6H_5}{\overset{C_2H_5O}{\diagdown}}\overset{\overset{S}{\|}}{P}-O-\text{[tetrahydroquinoxalinyl]}$ | 100 | 100 | 0 |
| $(C_2H_5O)_2\overset{\overset{S}{\|}}{P}-O-\text{[methyl-tetrahydroquinoxalinyl]}$ | 100 | 100 | 0 |
| $(CH_3)_2CHO-\underset{CH_3O}{\overset{\overset{S}{\|}}{P}}-O-\text{[tetrahydroquinoxalinyl]}$ | 100 | 100 | 50 |

Confused flour beetle (TC)—*Tribolium confusum* Jacquelin duVal

Compounds are formulated as 1% dusts on talc by admixing toxicant and talc, wetting with acetone and grinding with a mortar and pestle until dry. 125 mg. of this 1% dust are then blown into the top of a dust settling tower. The dust is allowed to settle on four-inch petri dishes for two minutes, giving a deposit of approximately 87 mg./sq. foot of the 1% dust. The dishes are removed and 25 adult confused flour beetles are added immediately. The dishes are held for three days at 80° F. and 60% R.H., following which mortality counts are made.

Large milkweed bug (MB)—*Oncopeltus fasciatus* Dallas

The 1% dusts described above are used in this test. The 1% dust is sprinkled evenly over the glass bottom of a seven-inch diameter cage, giving a deposit of approximately 94 mg./sq. foot of the 1% dust. Water is supplied in a bottle with a cotton wick, twenty adult bugs are added and a screen cover placed on the top. Mortality counts are made after holding for three days at 80° F. and 60% R.H.

German cockroach (GC)—*Blattella germanica* (Linnaeus)

The procedure is the same as for the large milkweed bug test, except that in this test only adult males are used.

Data are reported in Table III as percent kill of insects at the level of toxicant employed.

TABLE III

| Structure | TC, 1% | MB, 1% | GC, 1% |
|---|---|---|---|
| $(C_2H_5O)_2\overset{S}{\overset{\|}{P}}-O-$[quinoxaline] | 100 | 100 | 100 |
| $(CH_3O)_2\overset{S}{\overset{\|}{P}}-O-$[quinoxaline] | 100 | 100 | 100 |
| $(C_2H_5O)_2\overset{O}{\overset{\|}{P}}-O-$[quinoxaline] | 100 | 100 | 100 |
| $(i-C_3H_7O)_2\overset{O}{\overset{\|}{P}}-O-$[quinoxaline] | 30 | 100 | 10 |
| $(i-C_3H_7O)_2\overset{S}{\overset{\|}{P}}-O-$[quinoxaline] | 20 | 5 | 50 |
| $(n-C_3H_7O)_2\overset{S}{\overset{\|}{P}}-O-$[quinoxaline] | 100 | 100 | 50 |

In addition to the above tests, aqueous/acetone solutions containing either 100 p.p.m. or 0.1% of a test compound are applied to leaves of cotton plants. The leaves are permitted to dry, placed in petri dishes on a moist filter paper and infested with *Lygus lineolaris*, *Anthonomus grandis* or *Heliothis virescens*. The petri dishes are then placed in a constant temperature room held at 80° F. and 60% R.H. for two days. After two days, mortality counts are made and percent kill of insects recorded. Further, it has been found that the compounds of the present invention exhibit residual activity against the above-mentioned cotton pests.

The results are tabularized in Table IV below.

TABLE IV

| Structure | Lygus, p.p.m. 100 | Anthonomus, p.p.m. 100 | Heliothis, p.p.m. 100 |
|---|---|---|---|
| $(C_2H_5O)_2\overset{S}{\overset{\|}{P}}-O-$[quinoxaline] | 70 | 90 | 95 |
| $(CH_3O)_2\overset{S}{\overset{\|}{P}}-O-$[quinoxaline] | 100 | 100 | 100 |
| $(C_2H_5O)_2\overset{O}{\overset{\|}{P}}-O-$[quinoxaline] | 100 | 90 | 100 |
| $\underset{C_2H_5}{\overset{C_2H_5O}{\diagdown}}\overset{O}{\overset{\|}{P}}-O-$[quinoxaline] | 100 | 70 | 90 |
| $\underset{CH_3O}{\overset{C_2H_5O}{\diagdown}}\overset{S}{\overset{\|}{P}}-O-$[quinoxaline] | 80 | 100 | 100 |

To show the effectiveness against common malaria mosquito, *Anopheles quadrimaculatus*, test compounds are prepared as 10 p.p.m. and 1.0 p.p.m. solutions in acetone and coated on a hard surface accessible to contact by 4- to 5-day old mosquitoes of mixed sexes. A sugar solution is provided as food for the mosquitoes which are caged for 24 hours in such manner as to permit exposure of the mosquitoes to the treated surface. After the 24 hour period, mortality counts are made and the results recorded.

Test results are tabulated in Table V below.

TABLE V

| Structure | Mosquito, 10 | Adults, p.p.m. 1 |
|---|---|---|
| $(C_2H_5O)_2P(S)$-O-[quinoxaline] | 100 | 40 |
| $(CH_3O)_2P(S)$-O-[quinoxaline] | 100 | 70 |
| $(C_2H_5O)_2P(O)$-O-[quinoxaline] | 100 | 100 |
| $C_2H_5O$-S, $CH_3O$/P-O-[quinoxaline] | 100 | 100 |
| $CH_3S$-S, $CH_3O$/P-O-[quinoxaline] | 33 | --- |
| $C_2H_5O$-O, $C_2H_5$/P-O-[quinoxaline] | 100 | 0 |
| $(C_2H_5O)_2P(S)$-O-[quinoxaline-CH_3] | 100 | 0 |
| $(CH_3)_2CHO$-P(S)(OCH_3)-O-[quinoxaline] | 100 | 100 |

To demonstrate the effectiveness against the housefly, *Musca domestica* Linnaeus, groups of 25 adult female houseflies are placed in wide-mouth pint mason jars, and covered with a screen cap. The test compounds are formulated as an emulsion containing 1000 p.p.m. of test materials, an emulsifier, acetone, and water. This emulsion is diluted with 10% sugar solution, giving a concentration of 50, 5 or 0.5 p.p.m. The solution is placed so that the flies can feed on it through the screen. Mortality counts are made after two days at 80° F.

Results obtained are reported in Table VI below.

TABLE VI

| Structure | Fly, p.p.m. 50 | 5 | .5 |
|---|---|---|---|
| $(C_2H_5O)_2P(S)$-O-[quinoxaline] | 100 | 100 | 20 |
| $(CH_3O)_2P(S)$-O-[quinoxaline] | 100 | 100 | 24 |
| $(C_2H_5O)_2P(O)$-O-[quinoxaline] | 100 | 100 | 100 |
| $(i-C_3H_7O)_2P(O)$-O-[quinoxaline] | 100 | 100 | 96 |
| $(i-C_3H_7O)_2P(S)$-O-[quinoxaline] | 100 | 88 | 12 |
| $(n-C_3H_7O)_2P(S)$-O-[quinoxaline] | 100 | 100 | 0 |
| $C_2H_5O$, $CH_3O$/P(S)-O-[quinoxaline] | 100 | 100 | 60 |
| $(CH_3S)_2P(O)$-O-[quinoxaline] | 100 | 12 | 0 |
| $CH_3S$, $CH_3O$/P(S)-O-[quinoxaline] | 100 | 0 | --- |
| $C_2H_5O$, $C_2H_5$/P(O)-O-[quinoxaline] | 100 | 100 | 100 |
| $C_2H_5O$, $C_6H_5$/P(S)-O-[quinoxaline] | 100 | 0 | --- |
| $(C_2H_5O)_2P(S)$-O-[quinoxaline-CH_3] | 100 | 100 | 0 |
| $(CH_3)_2CHO$-P(S)(OCH_3)-O-[quinoxaline] | 100 | 100 | 56 |

EXAMPLE 20

The systemic activity of the compounds of the invention is demonstrated by the following tests.

The compound to be tested is formulated as an emulsion containing test material, an emulsifier, acetone, and water. This is diluted with water to give 100, 10 or 1 p.p.m. of toxicant in test. A sieva lima bean plant with only the primary leaves unfolded is cut off just above soil level and inserted into a bottle of test emulsion and held in place by a bit of cotton wrapped around the stem. The bottle is then placed in a ventilated box with the leaves extending outside the box, such that any possible fumes from the compound will be drawn out the end of the box rather than rising to affect the test leaves. About 50 adult two-spotted spider mites are placed on each leaf. After holding three days at 80° F. and 60% R.H., mortality estimates are made and one leaf from each plant is placed on a moist filter paper in the bottom of a petri dish. Ten third-instar southern armyworm larvae are added to each dish and mortality counts are made after holding another three days at 80° F. and 60% R.H.

Sieva lima bean plants with primary leaves three to four inches long are infested with about 100 adult mites per leaf four hours before use in this test. The mite and egg infested plants are dipped for three seconds in 0.1, 0.01 or 0.001% solutions of test compound, and the plants set in the hood to dry. They are held for two days at 80° F., 60% R.H., and the adult mite mortality estimated on one leaf under a stereoscopic microscope. The other leaf is left on the plant an additional five days and then examined at 10X power to estimate the kill of eggs and

TABLE VII

| Structure | Systemics | | | | | |
|---|---|---|---|---|---|---|
| | Mites, p.p.m. | | | Southern armyworm, p.p.m. | | |
| | 100 | 10 | 1 | 100 | 10 | 1 |
| $(C_3H_7O)_2P(S)-O-$quinoxalinyl 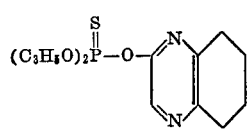 | 100 | 100 | 0 | 100 | 70 | 0 |
| $(CH_3O)_2P(S)-O-$quinoxalinyl 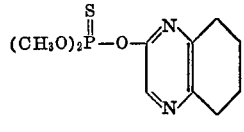 | 100 | 100 | 0 | 100 | 100 | 0 |
| $(C_2H_5O)_2P(O)-O-$quinoxalinyl 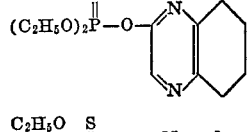 | 100 | 100 | 10 | 100 | 100 | 90 |
| $C_2H_5O(CH_3O)P(S)-O-$quinoxalinyl 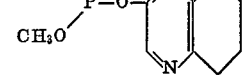 | 100 | 58 | 0 | 100 | 100 | 0 |
| $C_2H_5O(C_2H_5)P(O)-O-$quinoxalinyl 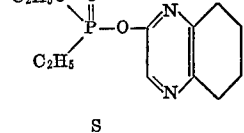 | 100 | 90 | 0 | 100 | 0 | 0 |
| $(C_2H_5O)_2P(S)-O-$methylquinoxalinyl 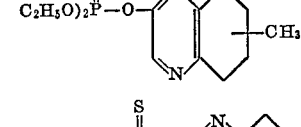 | 90 | 0 | ---- | 100 | 50 | ---- |
| $(CH_3)_2CHO(CH_3O)P(S)-O-$quinoxalinyl 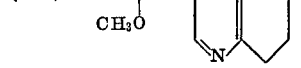 | 100 | 64 | ---- | 100 | 60 | ---- |

EXAMPLE 21

Arachnicidal activity of the compounds of the invention is demonstrated against the two-spotted spider mite, *Tetranychus urticae* (Koch).

of newly-hatched nymphs, giving a measure of ovicidal and residual action, respectively. Solutions are made in 65% acetone-35% water and the results are reported in tabular form in Table VIII below.

TABLE VIII

| Structure | Mites, percent | | |
|---|---|---|---|
| | .1 | .01 | .001 |
| $(C_2H_5O)_2\overset{S}{\overset{\|}{P}}-O-$[tetrahydroquinoxalinyl] | 100 | 100 | 87 |
| $(CH_3O)_2\overset{S}{\overset{\|}{P}}-O-$[tetrahydroquinoxalinyl] | 100 | 100 | 100 |
| $(C_2H_5O)_2\overset{O}{\overset{\|}{P}}-O-$[tetrahydroquinoxalinyl] | 100 | 100 | 100 |
| $\underset{(CH_3)_2N}{\overset{C_2H_5O}{}}\overset{S}{\overset{\|}{P}}-O-$[tetrahydroquinoxalinyl] | 100 | 100 | 0 |
| $(i-C_3H_7O)_2\overset{O}{\overset{\|}{P}}-O-$[tetrahydroquinoxalinyl] | 100 | 0 | 0 |
| $(i-C_3H_7O)_2\overset{O}{\overset{\|}{P}}-O-$[tetrahydroquinoxalinyl] | 100 | 0 | 0 |
| $(n-C_3H_7O)_2\overset{S}{\overset{\|}{P}}-O-$[tetrahydroquinoxalinyl] | 100 | 0 | 0 |
| $\underset{CH_3O}{\overset{C_2H_5O}{}}\overset{S}{\overset{\|}{P}}-O-$[tetrahydroquinoxalinyl] | 100 | 100 | 79 |
| $(CH_3S)_2\overset{O}{\overset{\|}{P}}-O-$[tetrahydroquinoxalinyl] | 100 | 100 | 0 |
| $\underset{CH_3O}{\overset{CH_3S}{}}\overset{S}{\overset{\|}{P}}-O-$[tetrahydroquinoxalinyl] | 100 | 0 | 0 |
| $\underset{C_2H_5}{\overset{C_2H_5O}{}}\overset{O}{\overset{\|}{P}}-O-$[tetrahydroquinoxalinyl] | 100 | 100 | 100 |
| $\underset{C_6H_5}{\overset{C_2H_5O}{}}\overset{S}{\overset{\|}{P}}-O-$[tetrahydroquinoxalinyl] | 100 | 100 | 60 |
| $(C_2H_5O)_2\overset{S}{\overset{\|}{P}}-O-$[methyl-tetrahydroquinoxalinyl] | 100 | 100 | 72 |
| $\underset{CH_3O}{(CH_3)_2CHO}\overset{S}{\overset{\|}{P}}-O-$[tetrahydroquinoxalinyl] | 100 | 100 | 100 |

EXAMPLE 22

Larvicidal activity of the compounds of the invention is shown in the following tests against the larvae of the malaria mosquito.

Common malaria mosquito—*Anopheles quadrimaculatus* Say Larvicide test

Groups of 25 larvae of the common malaria mosquito are placed in a 50 ml. beaker containing 25 ml. of water. The test compound is formulated as an emulsion containing .4 or .1 p.p.m. of test material, emulsifier, acetone, and water. The larvae in 25 ml. of water are added and mortality counts are made after 24 hours at 80° F. and recorded in Table IX.

TABLE IX

| Structure | Mosquito, Larvae, p.p.m. .4 | p.p.m. .1 |
|---|---|---|
| $(C_2H_5O)_2\overset{S}{\overset{\|}{P}}-O-$[tetrahydroquinoxalinyl] | 100 | 100 |
| $(CH_3O)_2\overset{S}{\overset{\|}{P}}-O-$[tetrahydroquinoxalinyl] | 100 | 100 |
| $(C_2H_5O)_2\overset{O}{\overset{\|}{P}}-O-$[tetrahydroquinoxalinyl] | 100 | 0 |
| $(n-C_3H_7O)_2\overset{S}{\overset{\|}{P}}-O-$[tetrahydroquinoxalinyl] | 100 | 20 |
| $\underset{CH_3O}{\overset{C_2H_5O}{}}\overset{S}{\overset{\|}{P}}-O-$[tetrahydroquinoxalinyl] | 100 | 100 |
| $\underset{CH_3O}{\overset{CH_3S}{}}\overset{S}{\overset{\|}{P}}-O-$[tetrahydroquinoxalinyl] | 80 | 0 |
| $\underset{C_2H_5}{\overset{C_2H_5O}{}}\overset{O}{\overset{\|}{P}}-O-$[tetrahydroquinoxalinyl] | 100 | 0 |
| $\underset{C_6H_5}{\overset{C_2H_5O}{}}\overset{S}{\overset{\|}{P}}-O-$[tetrahydroquinoxalinyl] | 100 | 50 |
| $(C_2H_5O)_2\overset{S}{\overset{\|}{P}}-O-$[methyl-tetrahydroquinoxalinyl] | 100 | 100 |
| $\underset{CH_3O}{(CH_3)_2CHO}\overset{S}{\overset{\|}{P}}-O-$[tetrahydroquinoxalinyl] | 100 | 100 |

EXAMPLE 23

Soil insecticidal activity is demonstrated by the following tests using the false wireworms, *Eleodes suturals* Say and the Southern corn rootworm, *Diabrotica undecimpunctata howardi* Barber.

The compound is formulated as a dust and incorporated into the soil at the equivalent of 50 to 10 pounds per 6-inch acre. The soil is sub-sampled into wide mouth bottles, and ten 6- to 8-day old rootworm or wireworm larvae added to each bottle, which is then capped. Mortality counts are made after six days at 80° F., 60% R. H. and recorded in Table X below.

TABLE X

| Structure | Rootworms, lbs./acre | | Wireworms, lbs./acre | |
|---|---|---|---|---|
| | 50 | 10 | 50 | 10 |
| $(C_2H_5O)_2\overset{S}{\overset{\|}{P}}-O-$[5,6,7,8-tetrahydroquinoxalin-2-yl] | 100 | 100 | 100 | 100 |
| $(CH_3O)_2\overset{S}{\overset{\|}{P}}-O-$[5,6,7,8-tetrahydroquinoxalin-2-yl] | 100 | 85 | 100 | 100 |
| $(C_2H_5O)_2\overset{O}{\overset{\|}{P}}-O-$[5,6,7,8-tetrahydroquinoxalin-2-yl] | 100 | 85 | 100 | 100 |
| $(i\text{-}C_3H_7O)_2\overset{O}{\overset{\|}{P}}-O-$[5,6,7,8-tetrahydroquinoxalin-2-yl] | 100 | 65 | 90 | 0 |
| $(i\text{-}C_3H_7O)_2\overset{S}{\overset{\|}{P}}-O-$[5,6,7,8-tetrahydroquinoxalin-2-yl] | 100 | 100 | 100 | 60 |
| $(n\text{-}C_3H_7O)_2\overset{S}{\overset{\|}{P}}-O-$[5,6,7,8-tetrahydroquinoxalin-2-yl] | 100 | 100 | 100 | 100 |
| $\begin{array}{c}C_2H_5O\\CH_3O\end{array}\!\!>\!\!\overset{S}{\overset{\|}{P}}-O-$[5,6,7,8-tetrahydroquinoxalin-2-yl] | 100 | 100 | 100 | 100 |
| $\begin{array}{c}CH_3S\\CH_3O\end{array}\!\!>\!\!\overset{S}{\overset{\|}{P}}-O-$[5,6,7,8-tetrahydroquinoxalin-2-yl] | 100 | 40 | | |
| $\begin{array}{c}C_2H_5O\\C_2H_5\end{array}\!\!>\!\!\overset{O}{\overset{\|}{P}}-O-$[5,6,7,8-tetrahydroquinoxalin-2-yl] | 100 | 90 | 100 | |
| $\begin{array}{c}C_2H_5O\\C_6H_5\end{array}\!\!>\!\!\overset{S}{\overset{\|}{P}}-O-$[5,6,7,8-tetrahydroquinoxalin-2-yl] | 100 | 75 | 55 | |
| $(C_2H_5O)_2\overset{S}{\overset{\|}{P}}-O-$[3-methyl-5,6,7,8-tetrahydroquinoxalin-2-yl] | 100 | 100 | 100 | 80 |
| $\begin{array}{c}(CH_3)_2CHO\\CH_3O\end{array}\!\!>\!\!\overset{S}{\overset{\|}{P}}-O-$[5,6,7,8-tetrahydroquinoxalin-2-yl] | 100 | 100 | 100 | 100 |

We claim:
1. A method for controlling insects and arachnids which comprises: applying thereto a plastically effective amount of a compound of the formula:

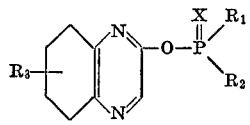

wherein X is a member selected from the group consisting of sulfur and oxygen; $R_1$ and $R_2$ are each lower alkyl, lower alkoxy, lower thioalkyl, phenyl, halophenyl, benzyl or —$NR_4R_5$; $R_3$ is hydrogen or lower alkyl; and $R_4$ and $R_5$ are each selected from the group consisting of hydrogen and lower alkyl.

2. The method according to claim 1 in which the compound is: O,O-diethyl O-5,6,7,8-tetrahydro-6(7)-methyl-2-quinoxalinyl phosphorothioate.

3. The method according to claim 1 in which the compound is: O,O-dimethyl O-5,6,7,8 - tetrahydro-2 - quinoxalinyl phosphorothioate.

4. The method according to claim 1 in which the compounds is: O,O - diisopropyl O-5,6,7,8 - tetrahydro - 2 - quinoxalinyl phosphorothioate.

5. The method according to claim 1 in which the compound is: diisopropyl 5,6,7,8 - tetrahydro-2-quinoxalinyl phosphate.

6. The method according to claim 1 in which the compound is: O,O-diethyl O-5,6,7,8-tetrahydro-2-quinoxalinyl phosphorothioate.

7. The method according to claim 1 in which the compound is: O-ethyl O-methyl O - 5,6,7,8 - tetrahydro-2-quinoxalinyl phosphorothioate.

8. The method according to claim 1 in which the compound is: O-isopropyl O-methyl O-5,6,7,8-tetrahydro-2-quinoxalinyl phosphorothioate.

9. A method of controlling insects and arachnids which comprises applying to their habitat a pesticidally effective amount of a compound of the formula of claim 1.

10. A method of protecting crops from insect and arachnid attack which comprises applying to said crops or to soil in which they are planted, a pesticidally effective amount of a compound of the formula of claim 1.

References Cited
UNITED STATES PATENTS
3,150,149    9/1964    Uhlenbroek et al. ____ 260—250

ALBERT T. MEYERS, Primary Examiner
L. SCHENKMAN, Assistant Examiner

UNITED STATES PATENT OFFICE
CERTIFICATE OF CORRECTION

Patent No. 3,577,536    Dated May 5, 1971

Inventor(s) Bernard Miller and Tamara Helen Mladineo Gund

It is certified that error appears in the above-identified patent and that said Letters Patent are hereby corrected as shown below:

Column 2, line 26, "conomical" should read --economical--.

Column 3, line 2, "halogentting" should read --halogenating--.

Column 3, line 50, "pohsphorochloridothioate" should read --phosphorochloridothioate--.

Column 7, line 35, "ethyl-O-5" should read --ethyl O-5--.

Column 8, line 24, "phosphorchloridate" should read --phosphorochloridate--.

Table I, the eighth line down, "10" should read --100--.

Column 13, line 26, "aduct" should read --adult--.

Table V, "Mosquito, 10" should read --Mosquito, p.p.m. 10--.

Column 15, line 35, "$C_2H_5O-S$" should partially read

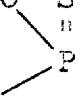

--$C_2H_5O$  S--.

Column 19, line 65, "72" should read --27--.

Column 23, line 3, "plastically" should read --pesticidally--.

Signed and sealed this 23rd day of May 1972.

(SEAL)
Attest:

EDWARD M. FLETCHER, JR.
Attesting Officer

ROBERT GOTTSCHALK
Commissioner of Patents